(12) United States Patent
Hanes

(10) Patent No.: US 7,089,496 B2
(45) Date of Patent: Aug. 8, 2006

(54) SYSTEM AND METHOD FOR SCENE DETECTION INFORMATION STORAGE

(75) Inventor: David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 806 days.

(21) Appl. No.: 09/911,017

(22) Filed: Jul. 20, 2001

(65) Prior Publication Data

US 2003/0016240 A1  Jan. 23, 2003

(51) Int. Cl.
    *G11B 27/00* (2006.01)

(52) U.S. Cl. .................. 715/719; 715/716; 386/46; 348/700

(58) Field of Classification Search ........ 345/719, 345/720, 721, 722, 723; 386/40, 45, 68, 386/69, 70, 125, 46; 715/719, 716; 348/700
See application file for complete search history.

(56) References Cited

U.S. PATENT DOCUMENTS

| | | | |
|---|---|---|---|
| 5,521,841 A | 5/1996 | Arman et al. | |
| 5,553,221 A * | 9/1996 | Reimer et al. | 345/720 |
| 5,559,949 A * | 9/1996 | Reimer et al. | 345/720 |
| 5,606,655 A | 2/1997 | Arman et al. | |
| 5,635,982 A | 6/1997 | Zhang et al. | |
| 5,802,245 A * | 9/1998 | Kunihiro | 386/98 |
| 5,828,370 A * | 10/1998 | Moeller et al. | 345/720 |
| 5,881,202 A * | 3/1999 | Herz | 386/68 |
| 5,903,264 A * | 5/1999 | Moeller et al. | 345/719 |
| 6,125,229 A * | 9/2000 | Dimitrova et al. | 386/69 |
| 6,137,544 A * | 10/2000 | Dimitrova et al. | 348/700 |
| 2002/0163532 A1* | 11/2002 | Thomas et al. | 345/723 |

OTHER PUBLICATIONS

"DVD + ReWritable 4.7 Gbytes / Basic Format Specifications / System Description," Version 1, Published by Royal Philips Electronics, Netherlands, Mar. 2001, 90 pages in addition to Table of Contents.

* cited by examiner

Primary Examiner—John Cabeca
Assistant Examiner—Ting Zhou

(57) ABSTRACT

A method for storing scene detection information is disclosed. The method comprises identifying scene candidates from received video data and formatting the scene candidates for storage on optical storage media. The optical storage media has a recordable capacity. The method also comprises storing the formatted scene candidates on the optical storage media in a media structure without reducing the recordable capacity.

20 Claims, 2 Drawing Sheets

SYSTEM AND METHOD FOR SCENE DETECTION INFORMATION STORAGE

TECHNICAL FIELD OF THE INVENTION

The present invention relates in general to video processing systems and more specifically to a system and method for storing scene detection information.

BACKGROUND OF THE INVENTION

With the proliferation of optical storage media such as Digital Versatile Discs (DVDs), consumers are often interested in creating discs containing data such as home videos to share with other family members or friends. Consumers may use video devices such as analog and digital camcorders and digital cameras to capture moving pictures as well as still-framed pictures. Such devices may record video data on a wide range of media, typically magnetic videotape, although other types of media, such as rotating magnetic and optical discs, may also be used. In addition, consumers may wish to record data that may be captured or streamed over the Internet.

Consumers may also use these devices to record home movies or home videos involving a wide range of subject matter. Consumers may easily and inexpensively capture large quantities of video material that may be maintained in good condition for many years. Unfortunately, it is usually necessary for a user to view videotape to determine what scenes may be contained on the tape. Furthermore, videotape technology is only sequentially or linearly accessible, which makes it difficult for a consumer to readily skip to a desired scene, unless the user has previously catalogued locations of the desired scenes by using tape footage or time counter functions available with typical videotape playback machines.

Moreover, scene or shot boundary detection has not traditionally been performed in real-time as video data is being recorded to media such as DVD. Even if scene detection can be performed in real-time, storing such information typically reduces the recordable capacity of the DVD discs.

SUMMARY OF THE INVENTION

From the foregoing, it may be appreciated that a need has arisen for providing scene detection information on optical storage media. In accordance with the present invention, a method and system for storing scene detection information are provided that substantially eliminate or reduce disadvantages and problems of conventional systems.

A method for storing scene detection information is disclosed. The method comprises identifying scene candidates from received video data and formatting the scene candidates for storage on optical storage media. The optical storage media has a recordable capacity. The method also comprises storing the formatted scene candidates on the optical storage media in a media structure without reducing the recordable capacity.

The present invention also comprises a system for storing scene detection information. The system comprises a processing module and scene detection information storage logic operatively associated with the processing module and operable to receive video data and identify scene candidates from the video data. The logic is further operable to format the scene candidates for storage on an optical storage medium, the optical storage medium having a recordable capacity. The system also comprises a media storage system operable to store the formatted scene candidates on the optical storage medium in a media structure without reducing the recordable capacity.

The present invention also comprises a system for storing scene detection information. The system comprises a processing module and scene detection information storage logic operatively associated with the processing module. The logic is operable to receive video data, identify scene candidates from the video data, and format the scene candidates for storage on an optical storage medium, the optical storage medium having a recordable capacity. The logic is further operable to cause the formatted scene candidates to be stored on the optical storage medium without reducing the recordable capacity.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE DRAWINGS

Figure 1:
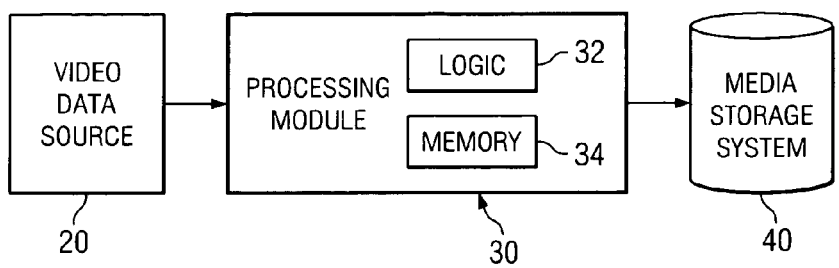
FIG. 1 is an example of a block diagram of a system that may be used for storing scene detection information according to an embodiment of the present invention.

FIG. 1 is an example of a block diagram of a system that may be used for storing scene detection information according to an embodiment of the present invention. In the embodiment illustrated in FIG. 1, system 10 includes a processing module 30 and a media storage system 40. One advantage of the present invention is that the invention provides for the automatic storage on optical media of scene detection information provided by a video data source 20. As one example, the present invention is particularly useful in the storage of home videos or other program material that may be contained on videotape or other video storage media, or video data streams from a source such as the Internet. Because the invention provides a system and method for storing scene detection information on optical media such as a DVD disc without reducing the recordable capacity of the DVD disc, the present invention allows a user to conveniently view indexed, formatted video data in an efficient manner. Accordingly, the present invention may provide the advantage of obviating the need for a user to manually screen or review an entire video tape to view desired video data.

Video data source 20 provides video data to processing module 30. Video data sources include any of a wide range of systems and devices now known in the art or that may be developed in the future. For example, video data source 20 may provide video data that is contained on storage media such as video tape (not explicitly shown) or a source that may produce video data continuously or "on the fly" as the video source is being used. Video data source 20 may be a digital or analog video camera and/or recorder, a videocassette recorder (VCR), or other source of video data, such as streamed data from the Internet. Video data may be digital video data, analog video data, or a combination of both.

Processing module 30 operates in conjunction with logic 32 to transform video data received from video data source 20 into formatted data that may be stored on optical media (e.g., a DVD disc) using media storage system 40. For example, in the embodiment shown in FIG. 1, processing module 30 may access and/or include programs or software routines of logic 32, depending on the particular application. For example, these routines may include, but not limited to, compression, encoding, and/or frame indexing routines. Processing module 30 may be connected to, or include, a memory system, such as a cache or random access memory (RAM) 34, suitable for storing all or a portion of these programs or routines and/or temporarily storing video or other data during various processes performed by processing module 30. Memory may be used, among other things, to support real-time analysis and/or processing of video data. Real-time processing may be defined as a speed at which video data is being recorded to optical storage media such as a DVD. For example, when using an analog camcorder, real-time may be defined as a speed at which a movie is normally played back. Then, memory 34 would be suitable for storing the various routines and/or temporarily storing the video data during the various processes performed by system 10. Alternatively, or in addition, processing module 30 may also include, or be coupled to, logic 32 that may be implemented in a variety of hardware and/or firmware configurations, including but not limited to, compression and/or encoding cards (not explicitly shown).

Processing module 30 may also in a particular embodiment control the overall function and operation of system 10. For example, processing module 30 may be a general-purpose programmable computer, such as the ubiquitous personal computer (PC), which is well known in the art and readily commercially available. Alternatively, processing module 30 may be more a task-specific or custom-designed processing system that may be specifically configured to interface with various devices and to perform in accordance with the methods described herein.

Media storage system 40 is operable to store data on optical storage media (not explicitly shown), such as a compact disc (CD) or Digital Versatile Disc (DVD), and is operable to couple with, and stores indexed, formatted data received from, processing module 30. The indexed, formatted data stored on the optical media may then be viewed as desired using any playback device such as a DVD movie player or DVD-ROM drive (not explicitly shown). Any DVD media storage system may then be used to store data on compatible optical storage media such as a DVD disc, which may then be played back on any of a wide range of DVD playback systems that are also well-known and readily commercially available. Alternatively, other types of media storage systems 40 that are now known or that may be developed in the future may be substituted for media storage system 40 to store data on optical storage media. Storage of the indexed, formatted data onto optical media such as a DVD provides the advantage of associating image files with a particular point in any video. For example, a DVD video playback device may display images using an indexed "menu" or "search" capability which allows a user to access that image at an appropriate place in the video data. The present invention provides the advantage of allowing automatic examination of video data and building of one or more menu systems.

While the embodiment illustrated in FIG. 1 and described herein is used to store formatted data on optical storage media such as DVD, other storage media currently known in the art or that may be developed in the future may also be used. In addition, although video data is described herein as either analog or digital data that may be received and/or stored in certain formats such as, but not limited to, VHS, beta, 8 mm, high-8, VHS-C, Moving Picture Experts Group (MPEG), Joint Photographic Experts Group (JPEG), Universal Disc Format (UDF), or Video Object Format (VOB), RF, S-video, other formats or data structures may also be used. Thus, the method and system of the present invention should not be limited to the particular storage media, formats, and/or data storage structures that are shown and described herein.

Analog video data may be received from a video data source 20 by any of a wide range of analog video data transmission systems that are well-known in the art, such as coaxial cable or S-video cable. Analog video data may also be in one of many formats such as NTSC, PAL, or video. On the other hand, digital video data may be received using a variety of bus systems such as, but not limited to, a system utilizing the 1394 bus protocol or the universal serial bus (USB) protocol. In a particular embodiment, digital video data may be organized in any of a wide variety formats or standards, such as MPEG, JPEG, or VOB. Digital video data received from video data source 20 may be uncompressed, or compressed according to respective compression formats such as MPEG and JPEG formats. As one example, data organized using the MPEG format is typically compressed.

Figure 2:
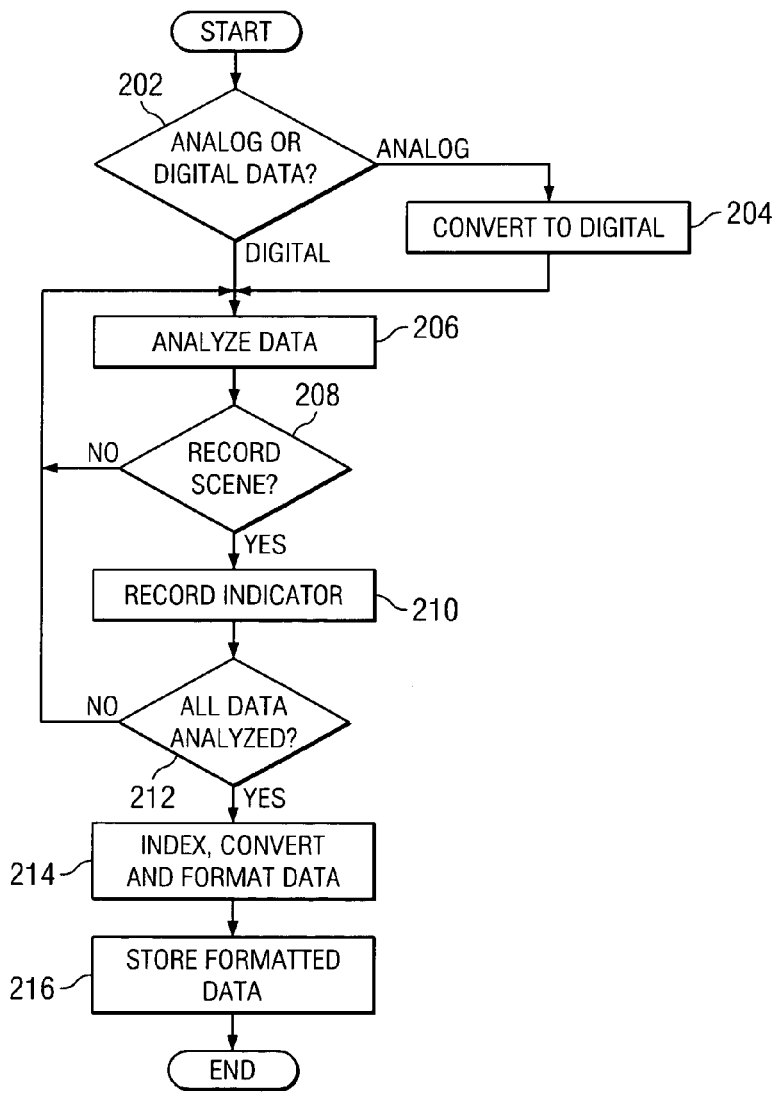
FIG. 2 illustrates an example of a method for storing scene detection information according to an embodiment of the present invention.

FIG. 2 illustrates an example of a method for storing scene detection information according to an embodiment of the present invention. Various embodiments may utilize fewer or more steps, and the method may be performed using a number of different implementations, depending on the application. Generally, the method provides for scene candidates to be identified from the received video data and indexed using a variety of methods, whether known or developed in the future. These scene candidates may be stored onto optical media for subsequent indexing, or stored after indexing. One method for such subsequent indexing may be performed by using the method described in U.S. patent application Ser. No. 09/542,689, filed Apr. 4, 2000 and entitled "Method & Apparatus for Automatically Generating a DVD Video Index File", assigned to Hewlett-Packard Co., the assignee of the present application.

Figure 3:
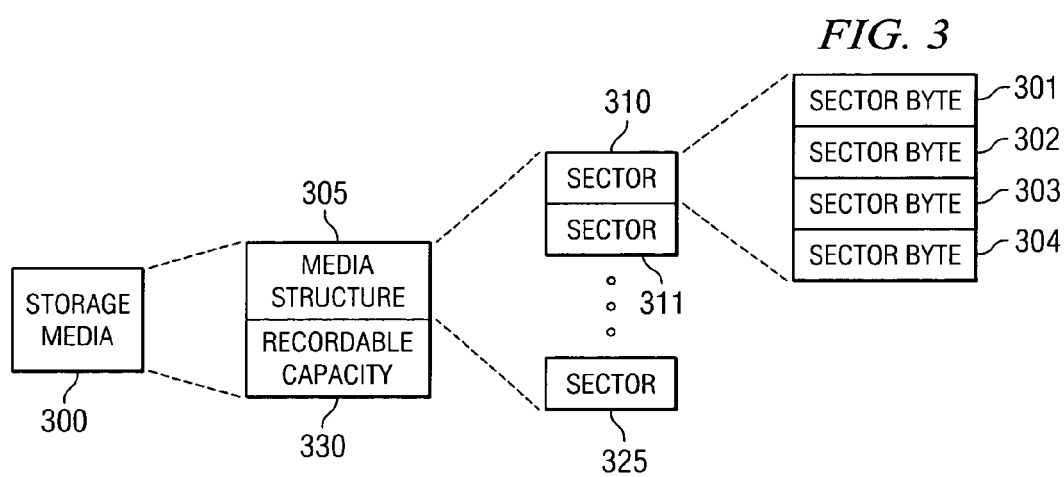
FIG. 3 graphically illustrates a representation of an example of a data structure on an optical storage medium where scene detection information may be stored according to an embodiment of the present invention.

One method for storing the indexed and formatted scene candidates and video data on an optical storage media using media storage system 40 is described in further detail in conjunction with FIG. 3. Thereafter, the data stored on the DVD disc may be viewed on a conventional DVD movie player. As one example, the VOB format allows a user to view an index or catalog of scenes that are contained on the DVD disc. This index or catalog of scenes allows the user to view the various video segments identified by the system 10 according to the present invention, but without having to view the entire contents of the DVD disc. That is, the user may readily skip to any desired and indexed scene identified from the video data that is stored on the DVD disc. Moreover, the recording and storage of these scenes or scene candidates does not reduce the recordable capacity of the DVD disc.

The method begins in step 202, where processing module 30 may receive video data from video data source 20. The method queries whether the received video data is analog or digital data. If the received video data is digital, the method proceeds to step 206. If not, analog video data may be converted to digital video data in step 204 by one of a variety of methods. For example, the conversion may be performed by any of a wide range of analog-to-digital conversion functions such as those that are typically found in a video capture card provided in a PC. After the conversion in step 204, the method may proceed to step 206.

In step 206, digital video data may be analyzed. For example, in step 206, the data may be analyzed by providing for the automatic detection and identification of certain video segments, such as, for example, shot boundaries (both sharp and gradual), camera operations, and key frames, as scene candidates from video data without requiring prior identification by a user. Thus, the term "automatically indexing" means any process which detects certain video segments in the video data without requiring a manual user input to identify or mark the video segment. In step 208, the method queries whether a scene should be recorded. If not, the method returns to step 206 to continue data analysis. If so, the method proceeds to step 210, where a frame index notation or indicator may be produced and stored into a media structure such as a disc control block (DCB) area of a DVD, as further discussed in conjunction with FIG. 3. Video data associated with the frame index notation or indicator may be stored in a location on a disc such as a Data Zone as provided for in the DVD+RW Spec as defined below.

That is, as used herein, the term "indexed video data" refers to video data having at least data representative of the video signal along with at least one frame index notation. The method queries in step 212 whether all data has been analyzed. If not, the method returns to step 206. If all data has been analyzed, the method proceeds to step 214.

In step 214, the data may be indexed, converted, and formatted. In a particular embodiment, automatic frame indexing may be performed by using the method described in U.S. patent application Ser. No. 9/062,868 filed Apr. 20, 1998 entitled "System and a Method for Automatically Detecting Shot Boundary and Key Frame from a Compressed Video Data" which is assigned to Hewlett-Packard Co., the assignee of the present application, and is hereby incorporated herein by reference for all that it discloses. This system and method provide for the automatic detection and identification of certain video segments contained in video data without requiring manual identification by a user. Such previous segments include, but are not limited to, shot boundaries (both sharp and gradual), camera operations, and key frames. This particular system may be advantageous in that it may be used with compressed video data without the need to first decompress the video data.

Generally, the automatic frame indexing routine disclosed in the above-referenced patent application includes a difference detector that detects content differences between video frames. When the difference detector determines that a first content difference between a current frame of a current group of frames and a previous frame of a previous group of frames is greater than a first threshold, a sharp shot boundary detector detects a sharp shot boundary within the current group of frames. When the difference detector determines that the first content difference is not greater than the first threshold but a second content difference between the current frame and a previous frame of a second previous group of frames is greater than a second threshold, a gradual shot boundary detector detects a gradual shot boundary within the current group of frames. The gradual shot boundary detector includes a pan frame detector that detects pan boundaries, a zoom detector that detects zoom boundaries, and a key frame detector that detects key frames. A threshold selection unit is coupled to the difference detector to select the thresholds in accordance with the content difference detected such that the sharp shot boundary detector, the gradual shot boundary detector, and the key frame function efficiently and effectively.

Alternatively, however, other types of automatic frame indexing routines are known and may be substituted for the system described in the referenced application. For example, the automatic frame indexing routine may comprise the type described in U.S. Pat. No. 5,635,982 entitled "System for Automatic Video Segmentation and Key Frame Extraction for Video Sequences Having both Sharp and Gradual Transitions", U.S. Pat. No. 5,606,655, entitled "Method for Representing Contents of a Single Video Shot Using Frames", or U.S. Pat. No. 5,521,841, entitled "Browsing Contents of a Given Video Sequence", all of which are hereby incorporated herein by reference for all that they disclose.

Frame indexing may also be performed manually if so desired. Manual frame indexing routines are known in the art and may be readily provided by persons having ordinary skill after having become familiar with the teachings of the present invention. Where scene detection is performed in real-time, scenes may be directly stored onto optical media for subsequent indexing. Alternatively, or in addition, where scene detection may not be performed in real-time, scene candidates may be generated. Scene candidates may be, for example, results of a scene detection algorithm that result in a selection of scenes according to an algorithm. For example, scene candidates may be processed automatically or manually to determine whether a scene change occurred, depending on the application. These scene candidates may be quickly generated and directly stored on to optical media for subsequent indexing as desired.

Then, indexed data may be formatted according to a wide variety of video data formats that are generally advantageous in the subsequent storage of video data on a selected medium such as DVD. For example, in a particular embodiment, indexed data may be formatted in VOB format, currently the standard for DVD movies. Other formats now known or that may be developed in the future may be used.

In step 216, the formatted data may be stored on optical storage media such as a DVD disc using media storage system 40. In a particular embodiment, this step may include encoding or formatting the indexed video data into a particular format or data structure that may be used to store the video data on a medium associated with optical storage system 40. For example, video data may be formatted or encoded in either VOB or UDF format for convenient storage on an optical storage medium associated with media storage system 40. Encoding and formatting are changes well known in the art and can be easily provided for by persons having ordinary skill in the art after having becoming familiar with the teachings in the present invention.

Moreover, step 216 may include the function of compressing the video data where desired. For example, decompression may be used to decompress compressed video data appropriately where indexing in step 214 may be preferably performed on uncompressed video data. On the other hand, step 216 may also include traditional compression techniques to compress uncompressed video data. As a result, the particular functionality of compression hardware or software will differ depending on the application and ordering of the steps for processing received video data. Moreover, routines for compressing and/or decompressing video data in accordance with any of a wide variety of digital compression protocols are well known in the art and can easily be provided by those having ordinary skill in the art after having become familiar with the teachings of the present invention.

The present invention contemplates performing steps during the method in various order, and thus the present invention should not be regarded as limited to processes or inserted steps that are performed in any particular order in the method. For example, steps 206–216 may be performed on many types of data and, thus may be placed at any convenient position in the method. For example, steps may be performed on analog data or converted video data such as MPEG or JPEG data, and may be located directly following step 202, step 204, or step 214, depending on the application. Still other configurations are possible, depending on the types of data existing at any particular stage during the method, and on the particular implementation of system 10.

FIG. 3 graphically illustrates a representation of an example of a data structure on an optical storage medium where scene detection information may be stored according to an embodiment of the present invention. The present invention may provide the advantage of storing scene detection information on optical storage media 300 such as DVDs without reducing the available storage capacity. The present invention may also provide the advantage of storing scene detection information on optical storage media 300 so that it may be indexed and/or accessed as desired.

Although FIG. 3 graphically illustrates a two-dimensional representation of a media structure, the invention contemplates the use of methods known in the art or that may be developed in the future to allow data to be stored on optical storage media 300 such as DVDs. For example, generally DVDs may be formatted using a recordable capacity 330 operable to store data content such as, but not limited to, video, music, multimedia and other data. In a particular embodiment, recordable capacity 330 may include a Data Zone as provided for in "DVD+RW 4.7 Gbytes Basic Format Specifications," V1.0, System Description, March 2001 (the "DVD+RW Spec"). Optical storage media 300 also may include an media structure 305, which includes an area allocated to store additional information that may be used for interchange between data interchange parties that does not reduce the recordable capacity 330. For example, and in a particular embodiment, media structure 305 may include a group of DCBs, which may be recorded in Inner and Outer Disc Identification Zones as provided for in the DVD+RW Spec.

Media structure 305 may be formatted using a variety of methods. For example, as provided in the DVD +RW Spec, each media structure 305 may include 16 physical sectors 310–325. Physical sector 310 may include several bytes reserved for information such as a content descriptor, unknown content descriptor actions, and drive ID, and several bytes that are content descriptor specific. For example, as illustrated in FIG. 3, areas 301, 302 and 303 may be used for content descriptor, unknown content descriptor actions, and drive ID header information. The remaining bytes 304 in sector 310 and up to fifteen (15) physical sectors 311–325 may be utilized to store content descriptor specific data. The formatted scene candidates may be stored in, for example, some or all of the byte 304 and physical sectors 311–325. Although a single structure is illustrated and discussed in conjunction with FIG. 3, the present invention contemplates the use of a variety of methods and structures that may be used to store applicable data as desired.

What is claimed is:

1. A method for storing scene detection information, comprising:
   identifying scene candidates from received video data;
   formatting the scene candidates for storage on optical storage media, the optical storage media having a recordable capacity; and
   storing the formatted scene candidates on the optical storage media in a media structure without reducing the recordable capacity.

2. The method of claim 1, wherein the formatting is performed utilizing one of the group consisting of Video Object Format (VOB) and Universal Disc Format (UDF).

3. The method of claim 1, further comprising receiving video data from one of the group consisting of a video camera, video recorder, and a digital data stream.

4. The method of claim 1, wherein the media structure comprises disc control blocks on the optical storage media.

5. The method of claim 1, further comprising indexing the scene candidates after storing the scene candidates.

6. The method of claim 1, wherein formatting includes indexing the scene candidates into a menu system.

7. A system for storing scene detection information, comprising:
   a processing module;
   scene detection information storage logic operatively associated with the processing module and operable to receive video data;
   identify scene candidates from the video data; and
   format the scene candidates for storage on an optical storage medium, the optical storage medium having a recordable capacity; and
   a media storage system operable to store the formatted scene candidates on the optical storage medium in a media structure without reducing the recordable capacity.

8. The system of claim 7, wherein the scene candidates are formatted utilizing one of the group consisting of Video Object Format (VOB) and Universal Disc Format (UDF).

9. The system of claim 7, wherein the video data is received from one of the group consisting of a video camera, video recorder, and a digital data stream.

10. The system of claim 7, wherein the media structure comprises disc control blocks on the optical storage medium.

11. The system of claim 7, further comprising indexing the scene candidates after storing the scene candidates.

12. The system of claim 7 wherein the formatting includes indexing the scene candidates into a menu system.

13. The system of claim 7 wherein the logic is implemented using software residing on a computer-readable medium.

14. A system for storing scene detection information, comprising: a processing module; and
   scene detection information storage logic operatively associated with the processing module and operable to receive video data;
   identify scene candidates from the video data;
   format the scene candidates for storage on an optical storage medium, the optical storage medium having a recordable capacity; and
   cause the formatted scene candidates to be stored on the optical storage medium without reducing the recordable capacity.

15. The system of claim 14, wherein the scene candidates are formatted utilizing one of the group consisting of Video Objects Format (VOB) and Universal Disc Format (UDF).

16. The system of claim 14, wherein the video data is received from one of the group consisting of a video camera, video recorder, and a digital data stream.

17. The system of claim 14, wherein the formatting includes indexing the scene candidates into a menu system.

18. The system of claim 14, wherein storing is performed using disc control blocks on the optical storage medium.

19. The system of claim 14, wherein the logic is implemented using software residing on a computer-readable medium.

20. The system of claim 14, wherein the logic is further operable to generate a list of scene candidates.

* * * * *